(12) United States Patent
Gordon

(10) Patent No.: US 8,453,373 B2
(45) Date of Patent: Jun. 4, 2013

(54) FISHING ROD HOLDER MOUNT

(76) Inventor: Jerry Gordon, Lancaster, SC (US)

( * ) Notice: Subject to any disclaimer, the term of this patent is extended or adjusted under 35 U.S.C. 154(b) by 117 days.

(21) Appl. No.: 12/765,237

(22) Filed: Apr. 22, 2010

(65) Prior Publication Data

US 2010/0269399 A1    Oct. 28, 2010

Related U.S. Application Data

(60) Provisional application No. 61/171,511, filed on Apr. 22, 2010.

(51) Int. Cl.
*A01K 97/10* (2006.01)

(52) U.S. Cl.
USPC ............ 43/21.2; 248/534; 248/538; 248/539

(58) Field of Classification Search
USPC ............ 43/21.2; 248/511, 534–536, 538–541
See application file for complete search history.

(56) References Cited

U.S. PATENT DOCUMENTS

| | | | | | |
|---|---|---|---|---|---|
| 1,520,543 | A | * | 12/1924 | Meachen | 43/21.2 |
| 2,427,600 | A | * | 9/1947 | Hanke | 248/540 |
| 2,516,759 | A | * | 7/1950 | Diderrich | 248/540 |
| 2,542,253 | A | * | 2/1951 | King | 43/21.2 |
| 2,619,308 | A | * | 11/1952 | Guestinger | 248/538 |
| 2,621,877 | A | * | 12/1952 | Grigsby | 43/21.2 |
| 2,632,616 | A | * | 3/1953 | Heistand | 248/540 |
| 2,704,412 | A | * | 3/1955 | Davis | 43/21.2 |
| 2,731,224 | A | * | 1/1956 | MacDonald | 248/511 |
| 2,950,836 | A | * | 8/1960 | Murdock | 248/538 |
| 3,017,149 | A | * | 1/1962 | Bossert | 248/534 |
| 3,140,069 | A | * | 7/1964 | McBurney et al. | 248/540 |
| 3,184,192 | A | * | 5/1965 | Hoerr | 248/538 |
| 3,290,816 | A | * | 12/1966 | Eklof | 43/21.2 |
| 3,444,643 | A | * | 5/1969 | Dobbs | 43/21.2 |
| 3,484,066 | A | * | 12/1969 | Aunspaugh | 43/21.2 |
| 3,564,753 | A | * | 2/1971 | Fravel | 43/21.2 |
| 3,601,919 | A | * | 8/1971 | Nixon et al. | 43/21.2 |
| 3,802,652 | A | * | 4/1974 | Holton, Jr. | 43/21.2 |
| 3,870,259 | A | * | 3/1975 | Reynolds | 43/21.2 |
| 3,903,634 | A | * | 9/1975 | Miyamae | 43/21.2 |
| 3,992,798 | A | * | 11/1976 | Schmitt, Sr. | 43/21.2 |
| 4,017,050 | A | * | 4/1977 | Rosenau | 248/534 |
| 4,064,811 | A | * | 12/1977 | Copeland | 43/21.2 |

(Continued)

FOREIGN PATENT DOCUMENTS

| DE | 10202351 A1 | * | 7/2003 |
|---|---|---|---|
| GB | 2107161 A | * | 4/1983 |

(Continued)

*Primary Examiner* — Darren W Ark
(74) *Attorney, Agent, or Firm* — Olive Law Group, PLLC

(57) ABSTRACT

A mount for being positioned on a rail and for receiving a fishing rod holder is provided. The mount includes a retaining member having a pair of spaced-apart walls that are interconnected on respective first ends by a connecting wall, the pair of spaced-apart walls defining a gap therebetween and a compression block selectively receivable within the gap of the retaining member and having a width that approximates a width of the rail. A fastener engages the compression block and extends from about respective second ends of each wall of the pair of spaced-apart walls and is configured such that tightening of the fastener deforms at least one wall of the pair of spaced-apart walls into engagement with the compression block, thereby providing an interference fit between the pair of spaced-apart walls of the retaining member and the rail.

7 Claims, 4 Drawing Sheets

U.S. PATENT DOCUMENTS

| | | | | | |
|---|---|---|---|---|---|
| 4,124,190 | A | * | 11/1978 | Wheeler | 248/538 |
| 4,156,982 | A | * | 6/1979 | Phillips, Jr. | 43/21.2 |
| 4,161,839 | A | * | 7/1979 | Ward | 43/21.2 |
| 4,198,775 | A | * | 4/1980 | Leisner | 43/21.2 |
| 4,270,724 | A | * | 6/1981 | McMullen | 248/534 |
| 4,640,038 | A | * | 2/1987 | Jershin | 43/21.2 |
| 4,657,249 | A | * | 4/1987 | Offutt | 248/539 |
| 4,658,533 | A | * | 4/1987 | Mendoza | 43/21.2 |
| 4,697,775 | A | * | 10/1987 | Wille | 248/231.41 |
| 4,739,575 | A | * | 4/1988 | Behrle | 43/21.2 |
| 4,852,291 | A | * | 8/1989 | Mengo | 43/21.2 |
| 4,901,970 | A | * | 2/1990 | Moss et al. | 43/21.2 |
| 5,014,458 | A | * | 5/1991 | Wagner | 43/21.2 |
| 5,020,765 | A | * | 6/1991 | Evans et al. | 248/539 |
| 5,054,229 | A | * | 10/1991 | Hughes | 43/21.2 |
| 5,142,809 | A | * | 9/1992 | O'Brien et al. | 43/21.2 |
| 5,163,652 | A | * | 11/1992 | King | 43/21.2 |
| 5,247,759 | A | * | 9/1993 | Noriega | 43/21.2 |
| 5,295,321 | A | * | 3/1994 | Matura | 43/21.2 |
| 5,365,689 | A | * | 11/1994 | Holliman | 43/21.2 |
| 5,438,789 | A | * | 8/1995 | Emory | 43/21.2 |
| 5,560,137 | A | * | 10/1996 | Herring | 43/21.2 |
| 5,561,937 | A | * | 10/1996 | Johnson | 43/21.2 |
| 6,007,042 | A | * | 12/1999 | Baynard et al. | 248/535 |
| 6,138,978 | A | * | 10/2000 | Andersen | 248/534 |
| 6,269,584 | B1 | * | 8/2001 | Peaschek | 43/21.2 |
| 6,276,651 | B1 | * | 8/2001 | Dolan | 248/538 |
| 6,378,819 | B1 | * | 4/2002 | Johnson | 248/539 |
| 6,584,723 | B2 | * | 7/2003 | Elmore | 43/21.2 |
| 6,591,541 | B1 | * | 7/2003 | Cummings | 43/21.2 |
| 6,898,893 | B1 | * | 5/2005 | Mukdaprakorn | 43/21.2 |
| 6,974,113 | B1 | * | 12/2005 | Clark et al. | 248/538 |
| 7,114,281 | B2 | * | 10/2006 | Miller | 43/21.2 |
| 7,200,968 | B2 | * | 4/2007 | Jaworski | 43/21.2 |
| 7,232,099 | B1 | * | 6/2007 | Wilcox | 43/21.2 |
| 7,434,775 | B2 | * | 10/2008 | Wilcox | 43/21.2 |
| 2006/0027725 | A1 | * | 2/2006 | Lin | 248/534 |
| 2006/0231723 | A1 | * | 10/2006 | Fayerman | 248/540 |
| 2008/0042027 | A1 | * | 2/2008 | LaScala | 248/540 |

FOREIGN PATENT DOCUMENTS

| | | | |
|---|---|---|---|
| GB | 2380223 A | * | 4/2003 |
| JP | 02177843 A | * | 7/1990 |
| JP | 08322444 A | * | 12/1996 |
| JP | 2004141091 A | * | 5/2004 |
| JP | 2005204522 A | * | 8/2005 |
| JP | 2006262831 A | * | 10/2006 |
| JP | 2007068520 A | * | 3/2007 |

\* cited by examiner

FISHING ROD HOLDER MOUNT

PRIORITY CLAIM

This application claims priority to U.S. Provisional Patent Application No. 61/171,511 filed on Apr. 22, 2010, the contents of which are hereby incorporated by reference.

TECHNICAL FIELD AND BACKGROUND OF THE INVENTION

This invention relates to a fishing rod holder mount for selectively and temporarily being installed on a boat rail.

Fishermen have long been plagued by how to securely hold a fishing rod in a boat, particularly while trolling or while on a fishing dock or pier while waiting for a fish to strike. Fishermen have tried to solve this problem by just laying the rod in the boat while trolling or laying the rod on the dock or pier. However, during trolling, if the lure or hook strikes an obstruction, the rod can be pulled out of the boat and the fisherman may either then lose their tackle, or the rod may broken or be damaged. If a fish violently strikes the boat or lure, the rod may be pulled overboard while trolling from a boat or while fishing from a dock or pier. In addition, if one fisherman in a boat is trolling and another is casting, it often results in tangling of lines unless the rod under trolling can be kept in a low profile position that does not obstruct the casting of the other rod.

Many boats have lacked sufficient numbers of or had poorly positioned rod holders. It is generally accepted that simultaneously fishing with multiple lines in the water dramatically increases the chances of catching a fish. Beyond the obvious advantage of merely increasing the odds of a strike, each hook may be placed at a different depth, different baits may be used, or other factors may be varied to determine an effective combination for a particular type of fish at a particular location at that particular time. Rod holders have been developed for a number of environments, allowing a single fisherman to maintain several rods at one time whether fishing from a boat, a dock, a bank side, bridge, or other.

In addition, rod holders have been developed in a variety of styles to fill various competing needs, i.e. rod holders for temporary installation versus rod holders for permanent installation; rod holders which hold the rod handle versus rod holders which support the rod while the handle rests on the ground or deck; rod holders developed specifically for use on a particular type of boat; rod holders to be supported from an automobile; rod holders for anchoring to the ground, and the like.

Rod holders are typically mounted to the boat or fishing vessel by some type of rod holder mount. In some instances, the rod holders are directly mounted into a complementary fastener found within the boat or fishing vessel. Usually, the limitations of prior art rod holders are due to an inability to effectively mount the rod holder.

A limitation of prior art rod holder mounts is that they cannot always mount in a convenient place. For example, most fisherman will want their fishing rod to be at an elevated position with a portion of the fishing rod extending out of the boat. However, most fishing rod holder mounts were only capable of being mounted in the floor of a boat. Another limitation is that prior art holder mounts are not readily portable and selectively placeable. Yet another limitation of many prior art rod holder mounts is the complexity of manufacturing the device. Ideally, a rod holder mount should be relatively simple to manufacture and should employee a minimal number of fasteners which may inadvertently loosen during use or which may be accidentally lost. Thus, it is an object of the present invention to provide a fishing rod holder mount which overcomes the problems and alleviates the needs discussed above.

SUMMARY OF THE INVENTION

Accordingly it is an object of the invention to provide a portable fishing rod holder mount.

A further object of the invention is to provide rod holder which is light weight and portable and which can be quickly and easily set up at virtually any desired location.

An additional object of the invention is to provide rod holder which is constructed to securely hold a fishing rod in a stable manner and to prevent the rod holder, rod, and related equipment from being pulled into the water or otherwise subjected to damage. A still further object of the invention is to provide rod holder which is simple and economical and yet has a rugged and durable construction for service over an extended operating life.

Yet another object of the invention is to provide rod holder which is simple to use and which operates safely.

It is another object of the invention to provide rod holder which is easily manufactured.

It is another object of the invention to provide rod holder which is aesthetically pleasing.

These and other objects of the present invention are achieved in the preferred embodiments disclosed below by providing a mount for being positioned on a rail and for receiving a fishing rod holder. The mount includes a retaining member having a pair of spaced-apart walls that are interconnected on respective first ends by a connecting wall, the pair of spaced-apart walls define a gap therebetween. A compression block is selectively receivable within the gap of the retaining member and has a width that approximates a width of the rail. A fastener engages the compression block and extends from about respective second ends of each wall of the pair of spaced-apart walls and is configured such that tightening of the fastener deforms at least one wall of the pair of spaced-apart walls into engagement with the compression block, thereby providing an interference fit between the pair of spaced-apart walls of the retaining member and the rail.

According to another embodiment of the disclosed subject matter, the fastener comprises a threaded bolt that selectively receives a cooperatively threaded nut.

According to another embodiment of the disclosed subject matter, the retaining member is generally u-shaped in cross-section.

According to another embodiment of the disclosed subject matter, the mount is made from aluminum.

According to another embodiment of the disclosed subject matter, each wall of the compression block defines two apertures spanning a width of the compression block for receiving the threaded fastener.

According to another embodiment of the disclosed subject matter, the retaining member defines two apertures for receiving the threaded fastener.

According to another embodiment of the disclosed subject matter, the compression block has a width that is smaller than the gap defined between the pair of spaced-apart walls.

According to another embodiment of the disclosed subject matter, the compression block defines a threaded aperture for receiving the fishing rod holder.

According to another embodiment of the disclosed subject matter, the threaded aperture is sized to receive a threaded fastener having a diameter from about ¼ to about ½ inches.

According to another embodiment of the disclosed subject matter, the mount is made from a CNC machining process.

According to another embodiment of the disclosed subject matter, the boat rail is generally rectangular.

According to another embodiment of the disclosed subject matter, the boat rail is generally cylindrical.

According to another embodiment of the disclosed subject matter, a fishing rod holder assembly is provided for being receiving on a boat rail. The assembly includes a retaining member having a pair of spaced-apart walls that are interconnected on respective first ends by a connecting wall. The pair of spaced-apart walls define a gap therebetween. A compression block is selectively receivable within the gap of the retaining member and having a width that approximates a width of the rail. A fastener engages the compression block and extends from about respective second ends of each wall of the pair of spaced-apart walls and is configured such that tightening of the fastener deforms at least one wall of the pair of spaced-apart walls into engagement with the compression block, thereby providing an interference fit between the pair of spaced-apart walls of the retaining member and the rail. A fishing rod holder has a rod supporting portion and an elongate shank portion that is configured for being received by the compression block.

According to another embodiment of the disclosed subject matter, a fishing rod holder assembly is provided. The assembly includes a u-shaped retaining member having a pair of spaced-apart walls interconnected by a connecting wall at a first respective end of each of the pair of spaced-apart walls and having at least one aperture defined through a respective second end of each of the pair of spaced-apart walls. A compression block has a receiving recess defined on an upwardly facing surface thereof and configured to fit between a gap defined between the pair of spaced-apart walls and has at least one aperture defined therethrough for receiving a fastener that extends through each of the at least one apertures of each of the pair of spaced-apart walls of the retaining members and through each of the at least one apertures of the compression block. A rod holder has a rod holding portion for holding a fishing rod and a shank portion that is configured for being selectively received within the receiving aperture of the compression block.

BRIEF DESCRIPTION OF THE DRAWINGS

Some of the objects of the disclosed subject matter have been set forth above. Other objects and advantages of the subject matter will appear as the subject matter proceeds when taken in conjunction with the following drawings, in which:

FIG. 3A is a front view of a compression block of the fishing rod holder mount;

DESCRIPTION OF THE PREFERRED EMBODIMENT AND BEST MODE

Figure 1:
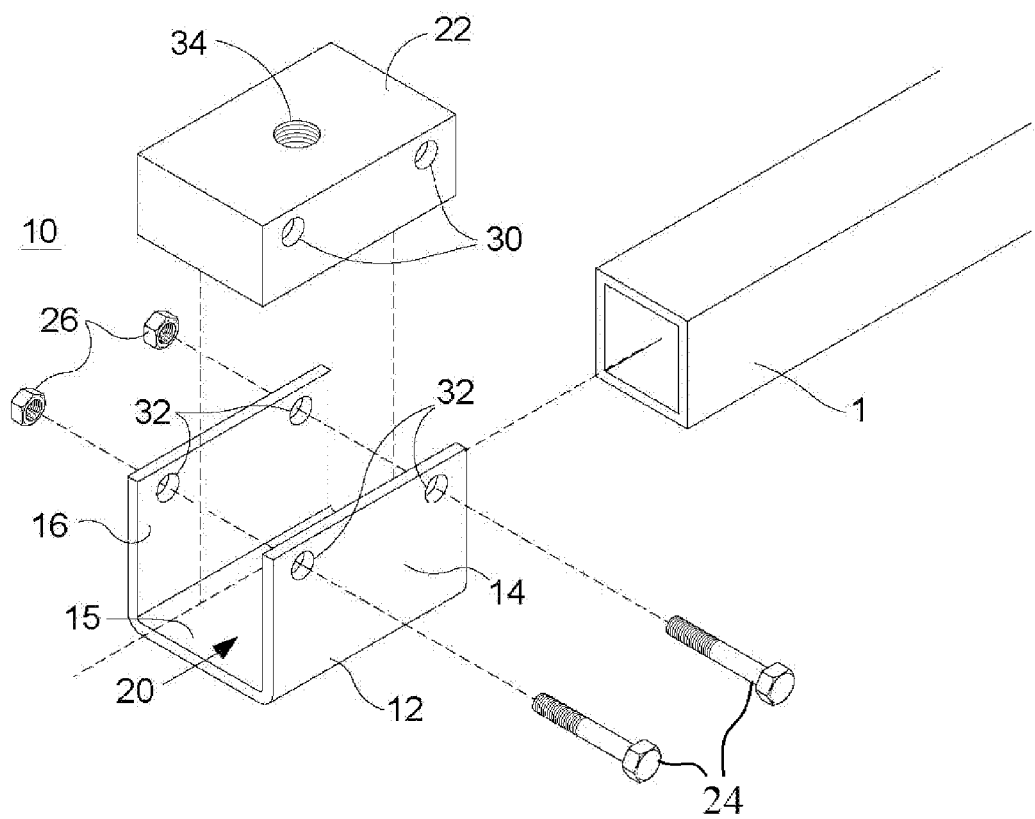
FIG. 1 is a perspective view of a fishing rod holder mount according to one embodiment of the presently disclosed subject matter.

Referring now specifically to the drawings, a preferred embodiment of a fishing rod holder mount 10 according to the present invention is illustrated in FIGS. 1 through 4, and illustrated generally as reference numeral 10.

As best shown in FIG. 1, the mount 10 includes a U-shaped retaining member 12 having a pair of spaced-apart walls 14, 16, that are interconnected by a connecting wall 15. A gap 20 is defined between the pair of spaced-apart walls 14, 16. The U-shaped retaining member 12 may be configured in other suitable shapes, though it is shown in a U-shaped configuration in FIG. 1. A compression block 22 is configured for fitting into the gap 20 of the U-shaped retaining member 12. In one embodiment, the compression block 22 will have a width that is less than the width of gap 20. The compression block 22 includes a pair of apertures 30 for receiving threaded fasteners 24 that are also received within complementary apertures 32 of each wall of the pair of spaced-apart walls 14, 16. The threaded fasteners 24 are configured to selectively fasten with threaded nuts 24. A lock-washer may also be employed for increased security. Due to the smaller width of the compression block 22 than the U-shaped retaining member 12, when the threaded fasteners 24 are tightened against each surface of the pair of spaced-apart walls 14, 16, the walls 14, 16 are deformed inward until they come into contact with the compression block 22. In another embodiment, only one of the walls 14, 16 may be deformed inward. In this manner, the pair of spaced-apart walls 14, 16 form a compression fit with a rail 1. Rail 1 may be a rail on a boat or other fishing vessel, and may be configured for other uses such as on a dock, pier, or other structure. Rail 1 is shown as a square rail in FIG. 1, but may be cylindrically shaped or otherwise. Still, in another embodiment, the compression block 22 and gap 20 may have the same general width as rail 1 such that no deformation of spaced-apart walls 14, 16 of the retaining member 12 is required to provide a fitting interface between the rail 1 and the retaining member 12. In another embodiment, the rail 1 height may be equal to the height defined between the bottom most surface of the compression block 22 and the top most surface of wall 15.

The compression block 22 includes a threaded recess 34 for connecting with a rod holder 2 that holds a fishing rod 4. The rod holder 2 has a threaded portion 3 adapted for being selectively received within the threaded recess 34. In one embodiment, the mount 10 is made from a CNC machining process and is formed from aluminum material. In other embodiments, the mount 10 may be made from stainless steel for improved corrosion resistance for saltwater fishing. Other materials or treatment process known within the art may be employed such as anodizing the aluminum for a retail finish or using steel for increased strength. The mount 10 and rod holder 2 are assembled to form a fishing rod holder assembly illustrated in FIG. 4.

In preferred embodiments, the threaded recess 34 is selected from a group of three standard English sizes, being ¼ inch 20 thread count, ⅜ inch 16 thread count, or ½ inch 13 thread count. In other embodiments, the threaded recess 34 may be configured to fit metric threaded or other English threaded measurements. The threaded recess 34 may span the entire height of the compression block 22 such that the threaded recess 34 is accessible for either the top or the bottom side of the compression block 22, or it may span only partially into the compression block 22. The threaded fasteners 24 may be made from a ¼ inch 20 count thread bolt having a length of 1.75 inches.

Figure 2A:
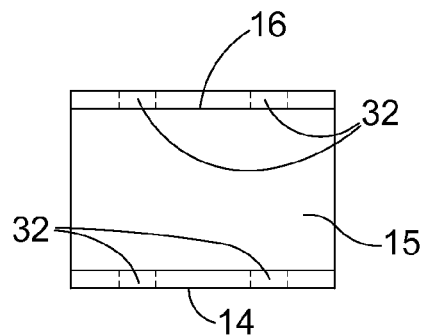
FIG. 2A is a top view of a retaining member of the fishing rod holder mount shown in FIG. 1.
Figure 2B:
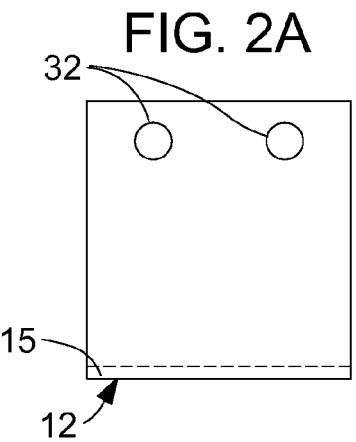
FIG. 2B is a side view of a retaining member of the fishing rod holder mount.
Figure 2C:
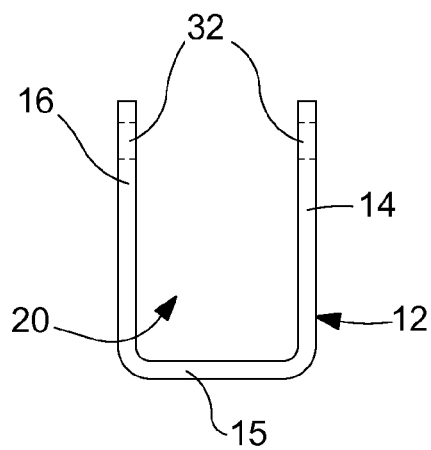
FIG. 2C is a front view of a retaining member of the fishing rod holder mount.

The U-shaped retaining member 12 is shown in greater detail in FIG. 2. In one embodiment, the U-shaped retaining member 12 has a length of 2.00 inches and a height from the top surface of the wall 15 to the top edge of the U-shaped retaining member 12 of 2.07 inches. The gap 20 is 1.26 inches and the member 12 is made of 0.125 inch material. From the top surface of the wall 15 to the geometric center of apertures 32 is 1.768 inches. Apertures 32 may have a diameter of 0.281 inches.

Figure 3A:
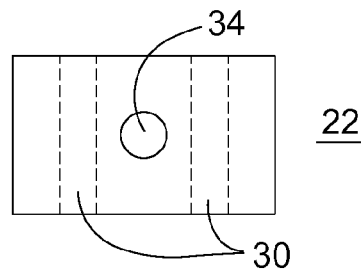
FIG. 3A is a top view of a compression block of the fishing rod holder mount shown in FIG. 1.
Figure 3B:
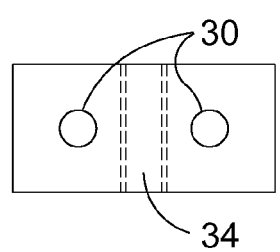
FIG. 3B is a side view of a compression block of the fishing rod holder mount.
Figure 3C:
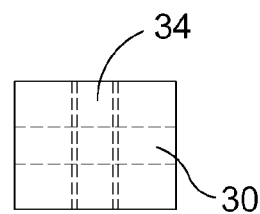
Figure 4A:
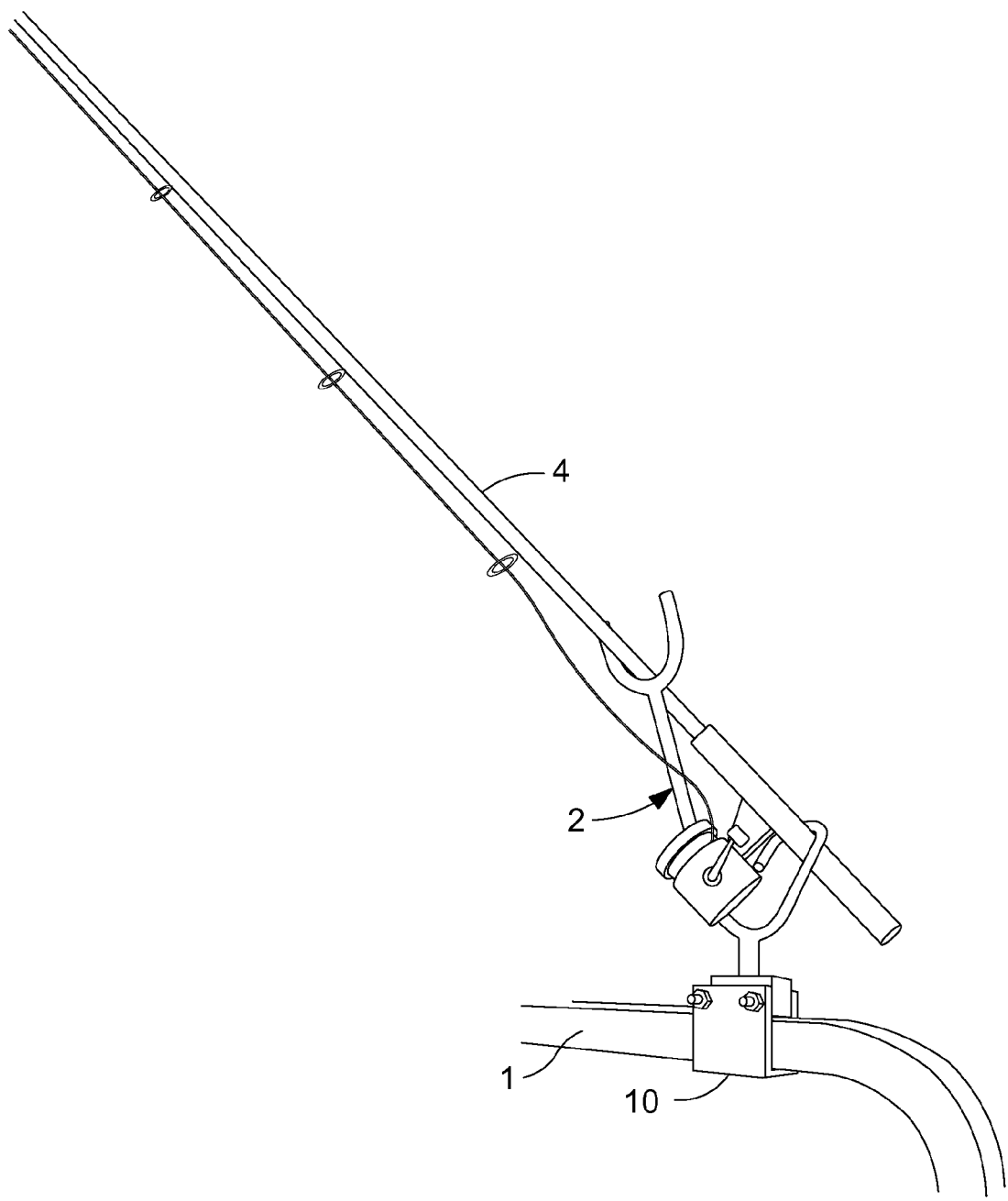
FIG. 4A is a perspective view of the rod holder mount installed on a boat rail.
Figure 4B:
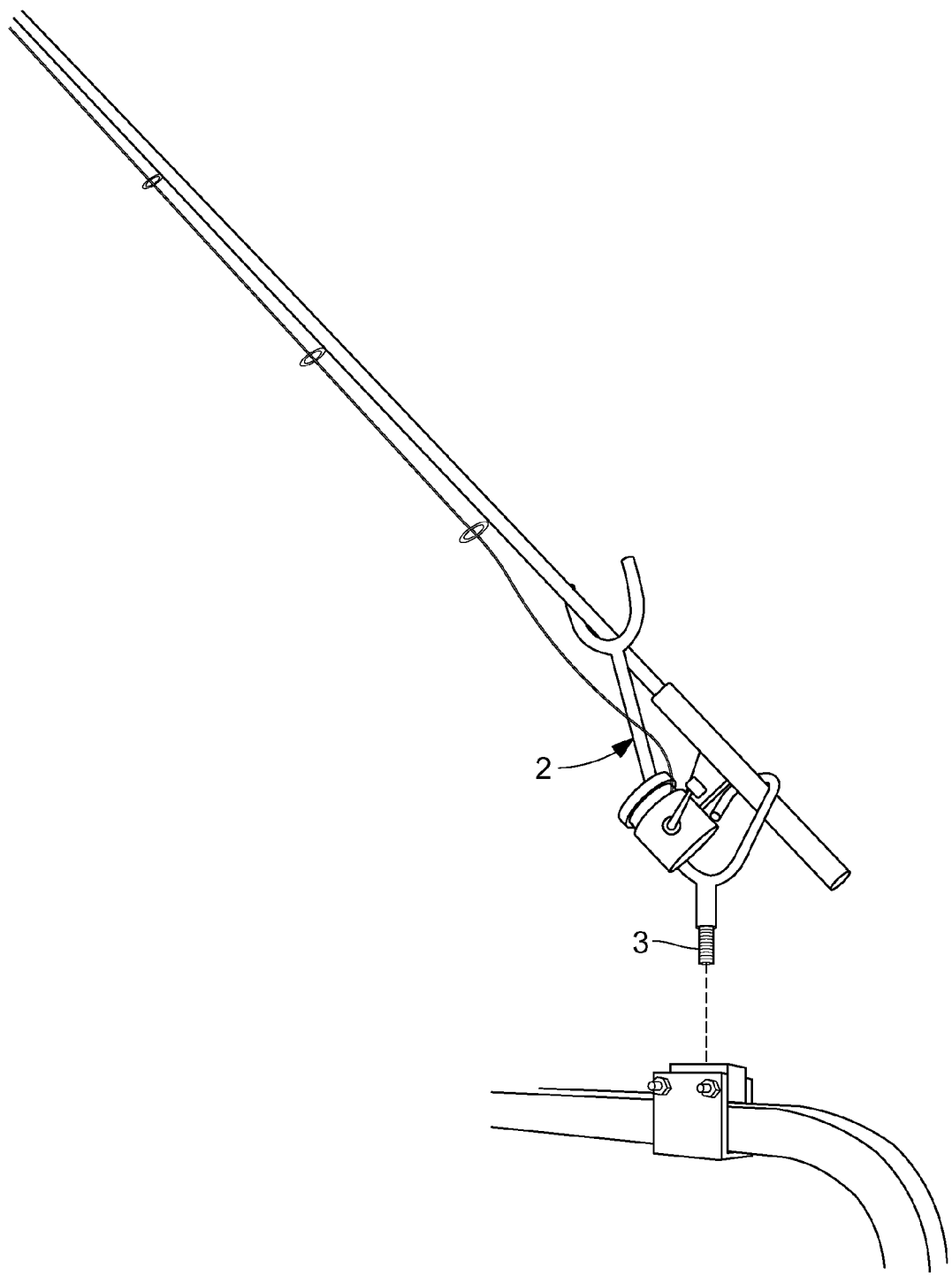
FIG. 4B is an exploded perspective view of the rod holder mount shown in FIG. 4A.

The compression block 22 is shown in greater detail in FIG. 3. The compression block 22 has a width of 1.240 inches and a length of 2.00 inches. The threaded recess 34 is positioned in the geometric center of the compression block. The compression block 22 has a height of 1.00 inches and each aperture 30 is positioned 0.4375 inches from an end surface of the compression block 22.

The advantages of the fishing rod holder mount 10 should be readily apparent to one skilled in the art. The mount 10 is aesthetically pleasing. The mount 10 is portable and can be easily mounted on any elongate structure. This is advantageous for appropriate placement on the boat or fishing boat. In some instances, it may be appropriate to fish out only one side of the fishing boat, like for example when the boat is anchored near a structure such that only one side of the boat is unobstructed, or in other circumstances where the current is such that it is only preferable to fish off of one side of the boat. Furthermore, the mount 10 is configured such that an endless number of mounts 10 can be employed on each boat. This is advantageous to accommodate additional persons or fishing rods. In addition, the mount 10 is reusable and repairable such that it has a long expected use life.

The foregoing has described a mount for being positioned on a boat rail and for receiving a fishing rod holder. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

The invention claimed is:

1. A fishing rod holder assembly for being received on a boat rail, the assembly comprising:
   a u-shaped retaining member having a pair of spaced-apart walls that are interconnected on respective first ends by a connecting wall which extends along entireties of the respective first ends, the pair of spaced-apart walls defining a gap therebetween;
   a compression block selectively receivable within the gap of the retaining member and generally extending between the pair of spaced-apart walls when the holder is installed about a boat rail, said compression block having a round receiving recess defined on an upwardly facing surface thereof, said receiving recess being located in a middle portion of said upwardly facing surface so as to be spaced away from all edges of said upwardly facing surface;
   at least two spaced-apart fasteners that engage the compression block and extend through and between respective second ends of each wall of the pair of spaced-apart walls and are configured such that tightening of the at least two fasteners deforms at least one wall of the pair of spaced-apart walls into engagement with the compression block, thereby providing an interference fit between the pair of spaced-apart walls of the retaining member and the rail, wherein the compression block is maintained in a fixed position relative to the spaced-apart walls by cooperation of the at least two fasteners; and
   a fishing rod holder having a rod supporting portion and an elongate shank portion that is configured for being received by the compression block,
   wherein the u-shaped retaining member and compression block cooperatively form an opening in which the boat rail is received.

2. The fishing rod holder assembly according to claim 1, wherein each of the at least two spaced-apart fasteners comprises a threaded bolt that selectively receives a cooperatively threaded nut.

3. The fishing rod holder assembly according to claim 1, wherein the retaining member is generally u-shaped in cross-section.

4. The fishing rod holder assembly according to claim 1, wherein the compression block has two opposing surfaces and each surface defines two apertures spanning a width of the compression block for receiving the at least two fasteners.

5. The fishing rod holder assembly according to claim 4, wherein the retaining member defines two apertures for receiving the at least two fasteners.

6. The fishing rod holder assembly according to claim 1, wherein the compression block has a width that is smaller than the gap defined between the pair of spaced-apart walls.

7. A fishing rod holder assembly comprising:
   a u-shaped retaining member having a pair of spaced-apart walls interconnected by a connecting wall at a first respective end of each of the pair of spaced-apart walls and having at least two apertures defined adjacent respective second ends of each of the pair of spaced-apart walls, said connecting wall extending along an entirety of the first respective end of each of the pair of spaced-apart walls;
   a compression block having a round receiving recess defined on an upwardly facing surface thereof and that generally extends between a gap defined between the pair of spaced-apart walls, said receiving recess being located in a middle portion of said upwardly facing surface so as to be spaced away from all edges of said upwardly facing surface;
   at least two spaced-apart fasteners that engage the compression block and extend through the at least two apertures and are configured such that tightening of the at least two fasteners deforms at least one wall of the pair of spaced-apart walls into engagement with the compression block, thereby providing an interference fit between the pair of spaced-apart walls of the retaining member and the rail, wherein the compression block is maintained in a fixed position relative to the spaced-apart walls by cooperation of the at least two fasteners; and
   a rod holder having a rod holding portion for holding a fishing rod and a shank portion that is configured for being selectively received within the receiving recess of the compression block,
   wherein the u-shaped retaining member and compression block cooperatively form an opening in which the boat rail is received.

* * * * *